April 21, 1970  C. C. CHESHIRE  3,508,089
APPARATUS FOR CONVERTING HEAT DIRECTLY INTO ELECTRIC ENERGY
Filed March 31, 1967   3 Sheets-Sheet 1
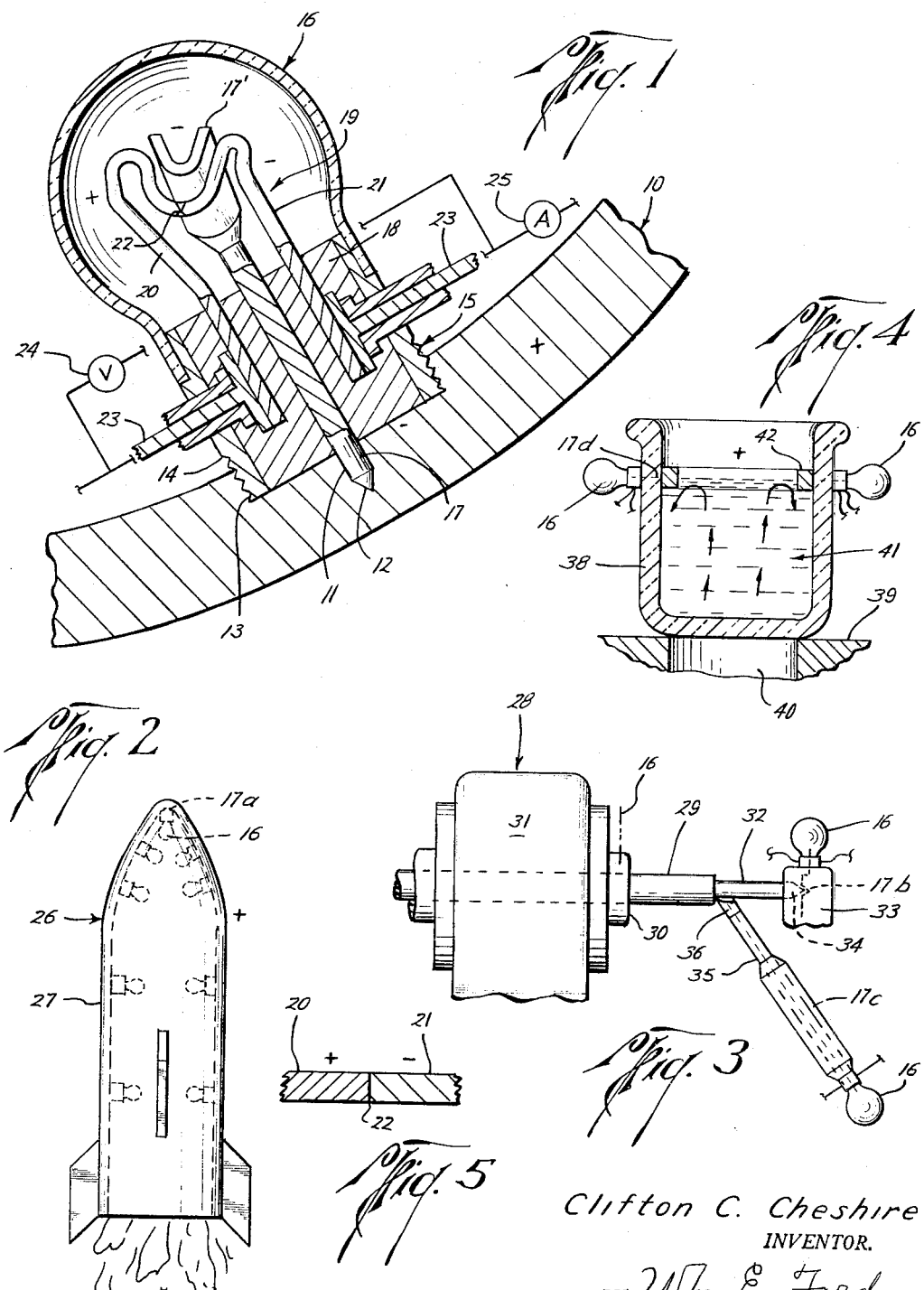
Clifton C. Cheshire
INVENTOR.
BY Wm. E. Ford
ATTORNEY April 21, 1970   C. C. CHESHIRE   3,508,089
APPARATUS FOR CONVERTING HEAT DIRECTLY INTO ELECTRIC ENERGY
Filed March 31, 1967   3 Sheets-Sheet 2
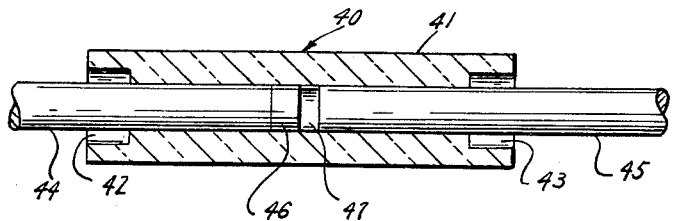
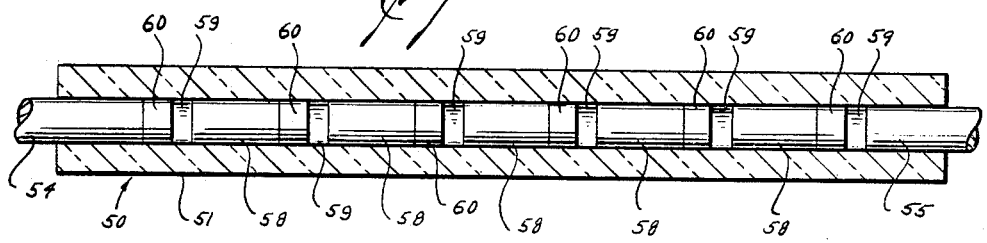
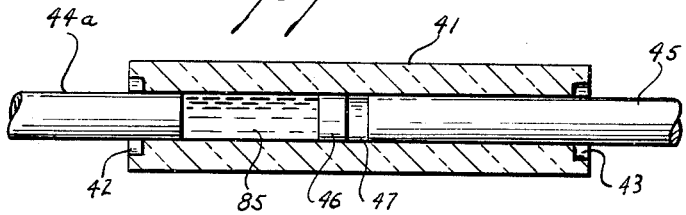
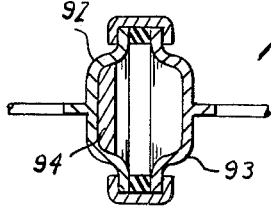
Clifton C. Cheshire
INVENTOR.
BY Carl B. Fox, Jr.
ATTORNEY April 21, 1970  C. C. CHESHIRE  3,508,089
APPARATUS FOR CONVERTING HEAT DIRECTLY INTO ELECTRIC ENERGY
Filed March 31, 1967  3 Sheets-Sheet 3

Clifton C. Cheshire
INVENTOR.

BY Carl B. Fox, Jr.
ATTORNEY

United States Patent Office 3,508,089
Patented Apr. 21, 1970

3,508,089
APPARATUS FOR CONVERTING HEAT DIRECTLY
INTO ELECTRIC ENERGY
Clifton C. Cheshire, 7201 Alabonson Road,
Houston, Tex.
Continuation-in-part of application Ser. No. 43,269,
July 12, 1960, which is a continuation-in-part of application Ser. No. 782,271, Dec. 22, 1958. This application Mar. 31, 1967, Ser. No. 644,421
Int. Cl. H02n 3/00
U.S. Cl. 310—4                                                23 Claims

ABSTRACT OF THE DISCLOSURE

This invention relates to methods and apparatus for translating heat energy or the like directly into electrical energy, wherein a cathode formed of an element high on the electromotive series is spaced very closely to an anode formed of an element lower on the electromotive series, wherein the close spacing is maintained and current flow facilitated by an oxide or salt of one of such elements, and wherein the cathode is heated to cause it to emit electrons.

RELATED APPLICATION

This is a continuation-in-part of a co-pending patent application filed July 12, 1960, and bearing Ser. No. 43,269, which in turn is a continuation-in-part of the then co-pending patent application filed Dec. 22, 1958, and bearing Ser. No. 782,271.

DESCRIPTION OF THE INVENTION

This invention relates to methods and apparatus for translating heat into electrical energy, from whatever source the heat may originate, as, for example, the heat of mechanical friction of solids moving in gases or liquids, the heat generated by physiochemical, radioactive phenomena, nuclear fission and fusion, electrophysical, and electrochemical reactions as in the case of the corrosion of metals, the heat transferred by heated water or liquids, solar heat, and the like; and the invention is equally adaptable to heat conversion into electrical energy when the heat may be developed through all of the various means of heat translation, as by conduction, radiation, or convection. In the case of electrochemical reaction, the invention may be used to control electrical potential.

The invention utilizes the well known phenomena whereby some materials emit electrons under certain conditions at greater rates than other materials under similar conditions. As scientists over the years have observed the performance of various elements as emitters or donors of electrons, tables have been arranged, termed electromotive tables, in which the elements are arranged sequentially in accordance with their relative capacities as donors or emitters of electrons. These tables have been subject to change, correction, and modification in the course of time as new elements have been discovered, and as it has been ascertained in the course of experimentation that certain elements may have several characters entitling it to several positions in the tables. Also, some rearrangement within the tables has resulted from observations of conditions under which certain elements emit electrons to a much greater degree than under other conditions.

Accordingly, an illustrative electromotive series table is set forth hereinbelow with the twenty-four elements listed therein arranged in conformity with generally accepted information, beginning with cesium as that element most capable of emitting excess electrons, and continuing to carbon as that element least adapted as an electron donor or emitter. Other such tables may not be in agreement with the table set forth as to minor details of arrangement, but the table includes most of the elements for which the property has been investigated and sets forth the relative positions of the elements to amply illustrate the theory involved in the application of the invention, such table being as follows:

| | | |
|---|---|---|
| Cesium | Zinc | Antimony |
| Potassium | Chromium | Arsenic |
| Calcium | Iron | Copper |
| Sodium | Cobalt | Mercury |
| Magnesium | Nickel | Silver |
| Aluminum | Tin | Platinum |
| Manganese | Lead | Gold |
| Selenium | Hydrogen | Carbon |

As it is well known that there occurs only a minimum degree of deterioration between elements, for example oxidation and corrosion in the absence of heat, the premise is advanced that if heat which is generated at any given location can be conducted or otherwise transferred away from such location, the deterioration at such location, attendant upon any interaction thereat, may be minimized.

As further background for an understanding of this invention it is well at this point to consider the general theory of corrosion inhibition as it is presently practiced to combat the corrosion of exposed steel structures, for instance iron, or steel structures at off-shore locations for drilling oil and gas wells.

Ordinarily there is a galvanic action set up whereby the steel or iron acts comparably to a negative battery plate from which ions are freed to flow through the salt water to be deposited or dissipated. However, when a material such as magnesium, which is higer on the electromotive series table than a material such as iron or carbon, is deposed at a selected point or points of the structure to be protected, it follows that ions will thus be detached from the magnesium to flow therefrom through the salt water to be dissipated. Thereby the electrolytic action of corrosion is inhibited as regards the structure to be protected, while the expendable magnesium is eaten away as intended.

It can be seen that if an element which is an excellent conductor of heat were placed in contact with an iron or steel object or structure to be protected, so that a flow of heat through the structure to such conductor could be created from structure areas at which heat is generated, then the deterioration at such areas would be appreciably reduced. Such conductor element must include some arrangement for dissipating the heat received by it from the object or structure. According to the present invention the heat may be converted to electric energy by an electrode consisting of a material above the lower end, and preferably near the higher end, of the electromotive series. Such an electrode may be connected by a heat conducting member connected to the structure or object as described above or may be directly connected to the structure or object, the former being hereincalled indirect connection and the latter direct connection. In the case of indirect connection, the heat conducting member serves as extension means of said structure or object to said electrode. Once the heat reaches the electrode it is converted to electrical energy by electron flow through the member to the electron emitting portions or areas of the electrode. Obviously, according to the principles of this invention, if an electrode composed of an element substantially higher upon the electromotive series than iron or steel, such as cesium or sodium, is brought into physical direct or indirect connection with such a structure with extension therefrom into an insulative enclosure space, such cesium element would stand as a cathode analogous to the cathode of a vacuum tube if there is provided in such arrangement means to serve as an anode or positive column within the inert space to receive the flow of electrons emitted by the cesium element. Heat flowing from the structure through the conductor, in the form of electron flow, which arives at the cesium or sodium element within the space, acts to reduce the naturally existing potential difference between the iron and the cesium (for example), according to the relative position of each element in the electromotive series.

It should be clearly understood, of course, that the manner in which heat is supplied to the cesium or sodium "cathode" is immaterial insofar as the basic concept of the present invention is concerned. For example, heat may be transferred to the cathode by conduction or radiaiton as well as by convection, or the transfer may be achieved by a combination of two or more such modes of heat transfer from the heat source to the cathode. What is essential is that electron emission from the cathode be produced by heating an element which is higher on the electromotive series than the element of which the anode is composed.

The basic theory of the present invention is not clearly understood. However, it appears to be a fact that if the so-called "anode" is composed of an element which is lower on the electromotive series or table than the element of which the "cathode" is composed, a difference in electrical potential will be inherently established between these two electrodes when they are disposed in close proximity to each other, (but in electrical isolation, one to the other), and when the cathode is heated by any means or mode so as to cause it to emit electrons which will tend to flow to the anode. Thus, a current flow across the two electrodes is created by this electron flow which is obviously useful for many purposes besides those hereinafter suggested.

Moreover, it is an apparent fact that the magnitude of the electron flow is a function of several factors besides the temperature of the cathode and the relative positions of the elements composing the cathode and anode. For example, the size of the emissive and receiving areas of the cathode and anode, respectively, would obviously seem to be a factor in the rate of electron emission and receipt. Additionally, it would seem apparent that the larger the gap is between the cathode and anode, the fewer will be the number of electrons which will manage to traverse this gap. Thus, it would seem that it is not only essential to keep the emitting and receiving surfaces of the cathode and anode physically separated, it is also essential to space them as close together as is physically practical.

However, it will be apparent that if maximum current flow is desired, it will be necessary to heat the cathode to relatively high temperatures. Inasmuch as the present invention requires the use of metallic elements in both the anode and cathode, it will be apparent that both elements will tend to expand and to contract as their temperatures vary, and thus the gap between the two electrodes will tend to change with changes in the temperature of either of the two electrodes. Accordingly, it is a significant feature of the present invention to provide means and method for disposing the anode and cathode at a very close spacing so as to maximize the rate at which the electrons emitted by the cathode may be received by the anode, and to also maintain physical separation of the cathode from the anode at any temperature short of a temperature which will melt or otherwise physically deform or destroy either the cathode or the anode.

In any event, it will be apparent from the foregoing that if the positive electrode or "anode" is constructed of dissimilar metals such as copper and manganese connected at an anode-junction, a substantial electrical potential difference will exist between these two anode elements according to the electromotive series. Thus, flow of the excess electrons from the cesium cathode will be attracted to the anode by potential difference to flow down the manganese, or more negative of the dissimilar metals, and ion travel will take place down the copper, or more positive, metal so that a complete electric circuit between the metals can be provided exterior of the structure and space.

Thus in the example taken, there will be an increase of electronic flow, in the form of electric current, from the positive copper to the negative manganese, and manganese stands substantially higher than copper in the electromotive series table. Conversely any counter-electromotive force will express itself in the flow of ions from the negative manganese to the positive copper. By connecting conductors, one to each of the copper and manganese pole parts of the anode which they comprise, the difference in potential across the conductors can be measured in units of electromotive force, such as volts.

With the foregoing premises set forth by way of introduction, it is stated that it is a primary object of this invention to provide methods and apparatus for translating heat into electrical energy from whatever source the heat may originate, and by whatever mode the heat may be received.

It is also an object of this invention to provide methods and apparatus for translating heat into electrical energy, where the heat may originate, for example, from mechanical friction between solids, from friction between solids moving in gases or liquids, from physiochemical and electrophysical reactions, from use in connection with electrochemical reactions as in the case of the corrosion of metals, or from transfer by heated water or other liquids.

It is a further object of this invention to provide methods and apparatus for translating heat into electrical energy whether the heat may arrive by either conduction, radiation, or convection at the source of employment of the invention.

Other objects and features of the invention will appear from the following descripiton of preferred embodiments thereof, reference being made to the accompanying drawings, of which:

FIGURE 1 is a sectional view showing a form of the invention employed as a translator of heat into electrical energy;

FIGURE 2 is an elevational view showing a form of the invention employed to translate into electrical energy the heat of friction between the shell, hull, or skin of a fast moving object, as a space ship, and the atmosphere or gaseous medium through which it moves;

FIGURE 3 is an elevational view, partially diagrammatic, showing a form of the invention employed to translate the heat of friction between relatively moving solid bodies, as machine tools, into electrical energy;

FIGURE 4 is an elevational view partly in section, showing the employment of the invention in receiving and dissipating or utilizing heat transferred by convection through a heated liquid, such heat being translated by electronic flow into the form of electrical energy;

FIGURE 5 is an enlarged partial view of a portion of the apparatus shown in FIGURE 1;

FIGURES 6–9 are axial cross sections of four forms of tubes according to the invention;

Figure 10:
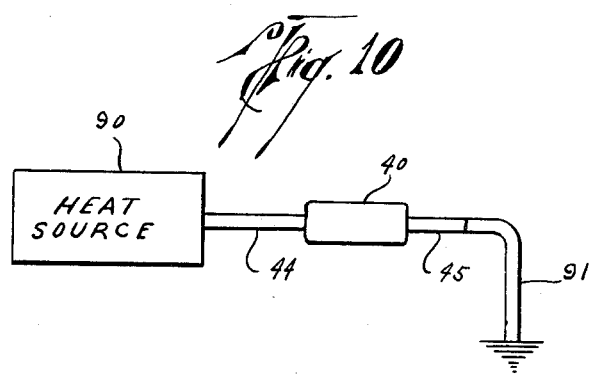
FIGURE 10 is a schematic showing of a tube connected between a heat source and ground.

Referring first in detail to FIGURES 1–5 of the drawings, in which corresponding reference numerals are assigned to corresponding elements in various views, structure 10 is shown indicated as being of some type of metal such as iron or steel, and wherein such structure may be the hull of a ship, a part of an oil rig over water, a section of a pipe line, or any other structural element ordinarily subject to corrosion. Structure 10 is shown as having a central bore 11 therein with a countersunk point 12 at the innermost center thereof. Outwardly of the bore 11 the structure 10 is counterbored and tapped at 13 to receive therein an adapter 14 forming the outer part of a closure 15 for tube 16, which may be a vacuum or inert gas-filled tube.

A heat conducting member 17 extends from within tube 16 through an insulative core 18 comprising the inner part of the closure 15, such core being of resin or of some other suitable insulative material adapted to seal with the inner surface of the adapter 14 which is preferably of a suitable metal.

Electrode 17′ which is mounted at the end of element 17, and which functions as the cathode in the depicted apparatus, is preferably formed of cesium or some other element which occupies a position high on the electromotive series of elements. It will be apparent that an element such as cesium is practically at the upper end of such series, and thus is highly responsive to heat, difference in temperature, or to an existing electrical potential, difference in potential, and is therefore an electronic donor or emitter of the highest order for purposes of the present invention. Electrode 17′ is shown having a U-shaped shield construction, and serves as the cathode of the tube 16. The shape of electrode 17′ is not important except that this shape functions to expose a large surface area to the anode assembly to be described, and also easily permits a very close spacing therebetween.

The tube 16 also has therein an electrode 19 (anode) which comprises a positive element 20 and a negative element 21 connected within the tube at a thermo-junction 22, the electrode elements extending in a U-shaped loop around the shield-shaped electrode 17′ of the cathode 17 and then downwardly into the core 18 of the insulative closure 15.

Conductors 23, 23′, within the core 18 are positioned or molded therein each to establish contact, respectively with part 20 or 21, and such conductors 23, 23′ extend insulatively through the wall of the adapter 14 to establish an electrical circuit externally of the tube 16. As shown in FIGURE 1 a voltmeter 24 may be connected in circuit across the conductors 23, 23′ to measure the electrical potential thereacross. An ammeter 25 may be installed in the conductor circuit to measure the current flow therein.

As indicated in the drawings by plus and minus signs, the members 20 and 21 are of dissimilar metals, with one being preferably substantially higher in the electromotive series than the other, the minus sign designating in this example the element manganese which is relatively high in such series, while the positive sign represents copper which is relatively lower in such series than manganese. At the same time a positive sign is placed in parenthesis behind the reference numeral 19 to designate that both elements 20 and 21 in combination comprise the anode column. At the same time a minus sign is placed within the cesium shield 17′ to designate the cathode element of the tube.

Tube 16, as has been indicated, may be a vacuum tube or an inert gas-filled tube. Tube 16 will, however, operate successfully if it is only sealed, to prevent gas interchange between its interior and exterior. In that case, the small amount of contained atmospheric oxygen will usually disappear through combination with some material within the tube, with small detrimental effect because of its small amount. It is also possible to fill the void of tube 16 with a subdivided solid material, as will be later explained.

In operation heat or electrical potential occurring within the body of, and at the structure 10, which might otherwise accompany the corrosion of the surface, is conducted by electronic flow to the cathode element 17 and into the tube 16 where the electrons in excess at the terminal or shield 17′ are directed therefrom to the thermo-junction 22. The so-called "excess" electrons actually do not constitute an excess except in the sense that the effect of election emissivity from the cathode member 17 provides an "apparent" excess of electrons. Any electrons emitted from the cathode element, and received by the thermo-junction, must of course be replaced by electron flow from body 10. In other words, there must be a complete electron-flow, or electrical circuit formed by an electrical connection between the cathode and anode elements exterior of tube 16, it being evident that the cathode element cannot continue to emit electrons unless the electrons are replaced. Thus, it has been found that an electrical current from the cathode to the anode is caused by the electron emissivity from the cathode. More important, it has been found that provision of a gap between the cathode emitter and the anode receiver, preferably in a vacuum or inert gas environment provided by a tube enclosure, results in a substantial current flow resulting in an E.M.F. change in elements connected to the cathode which will reduce the temperature thereof and, as a corollary result, inhibit or prevent corrosion.

Since the column elements 20 and 21 stand at different points in the electromotive series table a potential difference exists between these two elements and there is electronic flow from the copper to the manganese and, conversely, there tends to be a flow of ions from the maganese to the copper. There is thus created a measurable difference in potential enhanced by the flow of electrons from the cesium shield 17′ and down the column element 21, as illustrated in FIGURE 5. The main current flow is, of course, from the emitting cathode 17′ to the thermo-junction, this being the electron-removal effect on body 10 which reduces its temperature and changes its E.M.F. characteristics to be less negative.

Referring to FIGURE 2, a rocket or space ship 26 is shown having a number of tubes 16 therein with the cathode 17 of such tubes making electrical contact with the shell, hull, or skin 27 of the space ship, and after the manner hereinabove described, the heat or friction generated when the space ship passes at such terrific speeds through the atmosphere or any gases in outer space, may be translated by electronic flow into electrical energy which may be employed as desired; for example, such electrical energy could be employed in adding to the propulsive drive of the space ship.

Referring to FIGURE 3, a machine tool 28 is shown corresponding to a lathe or similar device including a cylindrical rod or piece work 29 to be rotated, such rod 29 being held by a conventional chuck 30 in the head 31 of the lathe and rotated by mechanism conventional to the heads of such machine. The end 32 of the rod stock is shown turned down to a conical point to pivot in a corresponding countersunk bearing in a carriage member 33 which is fixedly in position when the work stock 29 is rotated.

In this application of the invention the cathode element 17 may have an outer end 17b as shown which can be embodied in the carriage member 33 so as to extend around the conical bearing point 34 in close proximity to such element 34. The cutting tool 35 which is employed to turn down the rod or bar stop 29 has a cathode element 17 with an end 17c extending from the tube 16 and insulatively down a bore in the tool 35 to a point where it is brought into uninsulated contact with the cutting tip 36 of the tool 35. In this manner the heat of friction generated by the contact of the tool on the work part 29 may be translated from the tip 36 in the form of electronic flow and translated into electrical energy within the tube 16, to be carried therefrom through a suitable conductor circuit of the type and for the purpose hereinafter described. Also note that tube 16 may also be installed on the chuck 30.

Referring to FIGURE 4 an insulated vessel 38 is shown mounted on a suitable support 39 with heat 40 shown being supplied thereto so that the liquid 21 in such vessel is heated and heat is transferred upwardly therein by convection to a positive conductor 42, as of silver, which is affixed within the vessel 38 adjacent the upper part thereof. Tubes 16 are installed around the outer periphery of the vessel 38 and the ends, 17d of the cathodes 17 of the tubes extend through the wall of the vessel to establish electrical connection with the conductor 42 must be substantially less of an electron emitter and be spaced substantially further down on the electromotive table than the cathode, and that the anode, for best results, should be further down on the electromotive series than the conductor 42.

As is well known different elements have different abilities to withstand heat. Cesium, which has a relatively low melting point, should not be used as a vacuum tube cathode element in cases where high temperature could be encountered. Thus a cesium cathode element 17′ might be expected to serve well in cases where the heat to be generated and translated away will not reach an excessively high temperature. Thus it could be safe to employ the element cesium as a cathode in the forms of the invention shown in FIGURES 1, 3 and 4. On the other hand, in the case of the rocket ship shown in FIGURE 2, such high temperatures may be expected to be encountered that the element employed as the cathode should be an element such as selenium which can withstand substantially greater temperatures than cesium without bad effect.

In FIGURE 6, there is shown a tube 40 of simple form according to the invention. Tubular sleeve 41 of electrical insulating material is sealed at its ends by seal rings 42, 43 to a cathode rod or wire 44 and an anode rod or wire 45. Cathode 44 extends into sleeve 41 a short distance past the seal and is composed of material suitable for conducting both electrical current and heat. Anode 45 also extends into sleeve 41 a short distance past the seal and is composed of material suitable for conducting electrical current and is perferably lower than the cathode in the electromotive series. As depicted in FIGURE 6, the confronting ends or surfaces of the cathode and anode are preferably spaced apart within the sleeve as hereinbefore explained.

A body 46 of a material relatively highly electron emissive in the electromotive series of elements, such as cesium, potassium, sodium, selenium, etc., is disposed in close engagement with the end of cathode 44 within sleeve 41. A gap or space 47 may separate body 46 from the inner end of anode 45. The provision of a gap 47 is most important where the tube is to be used in connection with a system wherein the tube is powered by contact with a substance in which an electrical potential exists, although the tube will function on a less satisfactory basis without a gap in such system. Where the tube is powered by heat received from a contacted substance, the tube will function satisfactorily with or without the gap. Gap 47 may be either exhausted to form a vacuum or may be filled with an inert gas at any pressure, sub-atmospheric to superatmospheric, or may contain air, or may be filled with a subdivided oxide or salt of the cathode metal, or some other semi-conductive material permitting or enhancing flow of electrons from body 46 to anode 45 may be disposed therein as will hereinafter be explained. Gap 47 may extend around the sides of the anode and cathode, as for example as indicated by FIGURE 1 where the bulb serves the function of the sleeve. Body 46 will also be referred to as a dissimilar cathode element or means, since it forms an end extension of cathode 44 and is of dissimilar composition.

Then the outer, or left-hand, end of cathode 44 is disposed in close contact with a relatively warm or hot object, cathode 44, being a heat conductor, will receive heat from the object and at least some of the heat will be transmitted to body 46 by conduction. Thus cathode 44, or a plurality of tubes 40, can act to cool the object, particularly in view of the heat dissipation from body 46 to be described, which prevents build-up of temperature at the cathode or cathodes.

Body 46, when heated by conductance of heat from cathode 44, responds by an increase of electron emission from its surfaces adjacent gap 47, the emitted electrons crossing the gap to be received by electrical conductive anode 45, the latter being suitably grounded or connected to sustain flow of the received electrons (electrical current) therethrough. Were gap 47 not present, the electron emission would be directly from body 46 to anode 45. On the other hand, if the tube were powered by electrical potential, the tube would eventually break down if no gap were provided.

Therefore, it has been discovered that an apparatus including a heat conductor means such as cathode 44 surface-engaged by a relatively good electron-emissive substance such as body 46, and an electrical conductor such as anode 45 spaced across a gap from the electron-emissive substance, will produce a remarkable voltage differential when heat is applied to a part of the conductor even remote from the electron emissive substance. Isolation by sleeve 41, or its equivalent, enhances performance by preventing electron drift or loss from the gap. The heat applied to the cathode need not be large to produce a significant voltage, although increase of the heat causes increase in voltage. Body heat, frictional heat, heat from the vent of a hot water heater, are all sufficient for practical adaptations of the tubes 40 for electrical current supply or for voltage adjustments, such as in prevention of electrolytic corrosion.

In FIGURE 7 there is shown a tube 50 including an elongate tubular sleeve 51, corresponding to sleeve 41 of FIGURE 6, within which are received end portions of primary cathode 54 and primary anode 55. Cathode 54 includes emitting body means 60. Between the primary cathode and anode elements, there are spaced plural combined cathode-anode members 58, five such members being shown in the drawing. Between elements 60 and 58 and between 60 and 55, there are provided the spacing gaps 59. At the right-hand end of primary cathode element 54 and of each member 58, as shown in the drawing, there is an emitting element 60, the elements 60 being of like or unlike composition, but each being capable of electron emission across the adjacent gap 59. The element 60 at primary cathode 54 functions identically as element 46, FIGURE 6. Members 58 are described as combined cathode-anode members because the left-hand part of each, as shown in FIGURE 7, functions as a receiver of electrons emitted across the adjacent gap and therefore functions as an anode element, while the right-hand part of each functions as an electron-emitting cathode element. Elements 54, 55, 58 each seal with sleeve 51.

Electron emission of each member 60 may be selectd by selection of the element 60 composition according to the electromotive series and other physical properties according to the principles heretofore set forth.

The overall result of tube 50 is to provide an increase in voltage differential between elements 54, 55 over that realized between elements 44, 45, FIGURE 6, the separate voltages generated at the separate emitters 60 being substantially additive.

Besides the energy sources of heat and electrical potential, it is, of course possible to use other energy sources such as solar and radiation energy, the cathode receiving such energy and causing the same type of electron emission and electrical current and potential in the tube. Very good results can be achieved in that manner, and, particularly in the case of radiation energy from a radioactive source, such as gamma radiation from a radioactive body impinged on the cathode, very high currents and voltages may be obtained.

Figure 11:
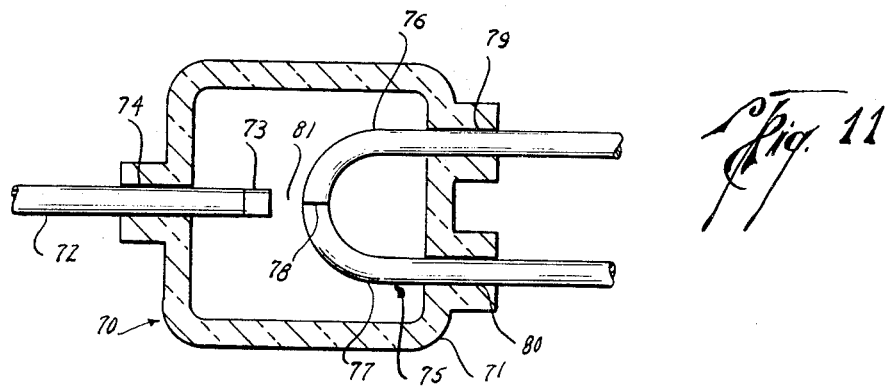
FIGURE 11 is a vertical cross-sectional view of tube apparatus similar to that of FIGURE 1, but of more generalized form.

FIGURE 11 shows tube apparatus 70 similar to that of FIGURE 1, but of more generalized form. Tube 71 receives cathode wire or rod 72 carrying emission body 73 at opening 74 where the tube is sealed to the rod. Anode 75, made up of dissimilar elements 76, 77 joined at junction 78, is sealed at openings 79, 80 disposed across the bulbular tube enclosure from cathode 72. A gap 81 spaces body 73 from anode 75. Cathode 72 is composed of a heat conducting substance; body 73 of a substance highly electron-emissive in the electromotive series; anode element 76 of a substance more highly emissive than anode element 77 in the electromotive series; elements 76, 77 both being less emissive in said series than body 73.

A part of cathode 72 exterior of tube 71 is placed in a position to be heated by any suitable heat source, such as a metal shell or hull, an animal body, a flame, etc. No electrical current normally passes from the heat source to body 73 through cathode 72, cathode 72 normally serving only as a transmitter of heat from the heat source to body 73.

Anode elements 76, 77, exterior of tube 71, may be joined or otherwise form part of a complete electrical circuit. Even slight temperature rise of cathode 72 will cause body 73 to strongly emit electrons which cross gap 81 to anode 75. Because of the dissimilar metal junction 78, electric current will flow along anode 75 in a certain direction, from the element 76 relatively more highly electron-emissive to the element 77 relatively less highly electron-emissive of the anode elements. The current will be made up mainly of flow of electrons received from body 73 plus a slight normally existing flow of electrons from element 76 to element 77 caused by their relative electromotive series positions. But the electron emissive part of the current (and voltage) is much greater than the slight normal current (and voltage) of junction 78.

Tubes of the type of tube 70 have many uses, cathode element 72 may function as a cooling element. Heat is translated into electricity. A flow of positive ions in the anode, in the direction from element 77 to element 76, is created. If element 76 is connected to cathode 72 outside tube 71, a counteraction of heat in the cathode 72 results, whereby the cathode will act even more effectively as a cooling element.

In FIGURE 8, there is shown a modified form of tube 40, FIGURE 6, wherein the cathode 44a extends only a short distance into sleeve 41 and a body of liquid mercury metal 85, is interposed between cathode 44a and body 46 of emission material. Mercury, being an excellent heat conductor, and its liquid form providing good contact with the cathode and emitter, steps up the efficiency of heat utilization and improves performance of the tubes. The anode in this tube would preferably be made of carbon.

Figure 13:
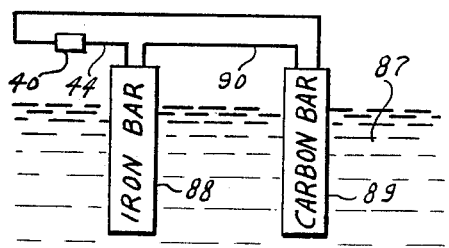

The degree of prevention of electrolytic corrosion possible through use of tubes provided by the invention is illustrated in FIGURE 13. Liquid 87 may be any type of liquid tending to promote corrosion of a metal such as iron or steel, such as dilute sulphuric acid, water, salt solution, and others. Bar 88 is composed of iron. Bar 89 is composed of graphitic carbon. Bars 88, 89 are connected by an electrical conductor 90. Thus arranged, iron bar 88 will normally corrode very rapidly, since galvanic action will be set up causing chemical decomposition of the iron with liberation of hydrogen at carbon bar 89, electrical current being caused to flow through conductor 90.

As shown in FIGURE 13, cathode 44 of a cell 40 (FIGURE 6) is connected to bar 88, the anode 45 of cell 40 being grounded or otherwise connected to permit electron flow therethrough from cell 40. Bar 88 in the absence of cell 40 would be negatively charged. However, action of cell 40 will cause the potential of bar 88 to be shifted to a positive potential through electron removal. This will minimize any further galvanic action and reduce corrosion of bar 88.

FIGURE 10 shows a cell 40 connected at its cathode 44 to a heat source 90, anode 45 being connected to ground by a conductor 91. This further illustrates the cooling action uses of the cells. Source 90 may be any source of heat, such as an automobile radiator, automobile exhaust, hot water heater hot flue gas vent, or any other. Source 90 will be significantly cooled by such application of one or more tubes 40, and if the tubes are connected in series the voltages produced are additive.

FIGURE 9 shows a modified form of tube, in which flanged metal half-shell 92 serves as the cathode element, flanged metal half-shell 93 serves as the anode element, and body 94 of highly electron-emissive substance is held in half-shell 92. An insulator ring 95 is disposed to electrically insulate between the half-shells, and the ring and half-shells are held in place as shown by insulating clamps disposed over the half-shell flanges. Tubes of this construction may be made of very small size, say, for example, the size of a small pea, so that many tubes may be placed in a small space and their anodes interconnected and their cathodes connected over a large surface to be cooled, thereby providing cooling for the entirety of the large surface while at the same time producing substantial flow of electrical current to the anode, which may be suitably connected for use of the current. Half-shell 92, of course, may be formed as part of the body to be cooled, if such body is composed of suitable material.

Figure 12:
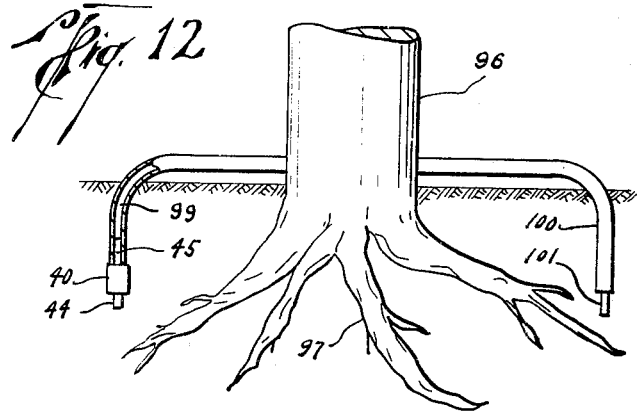
FIGURE 12 is a schematic cross-sectional view showing application of the invention to promote plant growth; and, FIGURE 13 is a schematic illustration of an application of the invention in preventing electrolytic corrosion.

In FIGURE 12, there is shown a method of using the cells to promote growth of plants, an electrochemical application of the invention. A plant 96 has root system 97 below the ground surface 98. A tube 40 is buried in the earth with its cathode 44 exposed to the soil. The anode 45 is electrically connected to a conductor 99 which extends around the base of the plant, either above ground surface 98 as shown, or buried, to the opposite side of the plant. Anode 45 and conductor 99 are insulated by insulation 100 except at the anode end 101 which is exposed to the soil. Tube 40 sets up an electrical current, in response to electropotential of the earth solutions at cathode 44, through conductor 99 and the earth between cathode 44 and anode end 101. The current flow occurs at least partly as ion flow through the earth between cathode and anode, and chemical plant growth promoters used as the anode and/or cathode material can be dispersed at the root system. For example, anodes and cathodes made of zinc, magnesium, nickel, cobalt, copper, phosphorus, calcium, iodine, maganese, and others, have been used with resultant plant benefaction.

Any of the named materials may be used as anode and cathode materials, it being necessary, however, to observe the principles hereinbefore set forth so that the cathode material is higher in the electromotive series than the anode material. For example, if potassium is chosen as the cathode material, then the anode material must be manganese or some other material which is lower than potassium on the electromotive series.

As hereinbefore stated, it is preferable to maximize the current flow developed across the anode and cathode by spacing the two electrodes as close together as possible, so that electron flow therebetween will be facilitated to a maximum degree. It will be apparent that the atoms or molecules of any gases which may be located in this gap will tend to block the path of the electrons, and thus it is preferable that the so-called "active" ends of these electrodes be disposed in a vacuum or low density atmosphere as has hereinbefore been stated.

However, it will be apparent that, if the gap 47 between the emissive and receiving ends or surfaces of the cathode 46 and anode 45 depicted in FIGURE 6 is unoccupied (except by a low density atmosphere), as has hereinbefore been suggested, the particular spacing of this gap 47 will be difficult to maintain with precision due to expansion and contraction of one or both of the anode 45 and cathode 46 in response to changes in temperatures. Although current flow across these two electrodes will not necessarily cease if they become urged together due to such expansion, it has been found that there is an appreciable reduction if not total cessation in such current flow when these two electrodes move into contact.

Accordingly, it has been found to be especially desirable for purposes of the present invention to dispose in the gap 47 an oxide or salt of the element of which the cathode 46 is composed. It is not entirely clear why a substance of this type has proved so effective for these purposes, but it has been demonstrated that such a substance efficiently conducts the electrons from the cathode 46 to the anode 45 without apparently reducing their number or velocity to any appreciable degree. Furthermore, the interposition of such a substance not only apparently eliminates the necessity to reduce the density of the gaseous atmosphere in the sleeve 41, but also serves to maintain separation of the anode 45 and cathode 46 even when their active surfaces are spaced very close together.

No particular volume of such oxide or salt need be disposed between the anode 45 and cathode 46 to achieve satisfactory spacing and conducivity between these two electrodes. Inasmuch as it appears to be desirable to provide as a close a spacing as possible, it appears that only a very thin layer of such oxide or salt need be provided therebetween. In fact, it has been found that the oxide coating which develops from oxidation of the emissive surface of the cathode 46 will provide a spacing between the cathode 46 and the anode 45 which is quite satisfactory for the purposes of the present invention.

As hereinbefore stated, it is not clearly apparent how the oxide or salt layer or coating in the gap 47 operates to effectively conduct the electrons emitted by the cathode 46. However, it is known that materials which are commonly known as non-conductors will nevertheless be effective conductors when disposed between two conductors in a thin enough layer. Thus, it would appear that at the interface between the active surface of either the cathode 46 or the anode 45, and the portion of the oxide or salt or other spacing material in the gap 47 and adjacent either or both interfaces, may act as an intrinsic semiconductor as to the electrons flowing across gap 47. Alternatively, it may be that the impurities which will unavoidably be present in the spacing material may function to cause the material in the gap 47 to act as an extrinsic semiconductor. In either respect, reference may be had to "Elementary Modern Physics"; 1960, by R. T. Weidner and R. L. Sells; and in particular to the discussion therein at p.p. 467-475 of the band theory solids as it relates to this aspect of the present invention.

In any event, it would seem to be a fact that the magnitude of the current flow across the gap 47 will be a function of several factors including, but not limited, to the relative work products and positions in the E.M.F. series of the elements forming the cathode 46 and anode 45, the size of the gap 47, the temperatures of the cathode 46 and anode 45, and the particular substance used as the spacing material in the gap 47. In other words, it would seem apparent that there will be a current flow established from the cathode 46 to the anode 45 only to the extent that the electrons emitted by the cathode 46 exceed in number or rate of emission the electrons emitted by the anode 45, and that it is a feature of the present invention to provide means and method for maximizing this difference in emission, as well as to maximize the electron emission from the cathode 46 and the acceptance of such electrons by the anode 45. Accordingly, if the emissive surfaces of the cathode 46 and anode 45 are substantially equal in size, as is suggested in FIGURE 6, and if the temperatures of the cathode 46 and anode 45 are substantially equal, (as will be the case if the cathode 46 receives heat in the form of radiant energy from an indeterminate external location), then it is preferable that the cathode 46 be composed of a material having a substantially higher work function than that of the anode 45 so that the difference in emissivity between the cathode 46 and anode 45 will be maximized.

It will thus be apparent that this sought-for-difference in emission of electrons can be further maximized by providing an anode 45 having a smaller emissive surface than that of the cathode 46, or that the anode 45 may be kept at a lower temperature than that of the cathode 46, or both. In the case of the structure depicted in FIGURE 6, or the like, it will be apparent that it is difficult to maintain the anode 45 at a temperature lower than that of the cathode 46, if the cathode 46 received its heat in the form of radiant energy from the environment of the tube 1. Accordingly, it is desirable that the anode 45 be constructed of a material such as copper or aluminum which is not only relatively low on the electromotive series, and which not only has a higher work function as compared to substances such as cesium or sodium which are especially satisfactory for use as the cathode 46, but which also have a high coefficient of thermal conductivity. Thus, heat which is applied to an anode 45 formed of a metal such as copper or aluminum will tend to be more rapidly dissipated, and thus an anode 45 formed in this manner will tend to have a lower temperature even when the entire assembly is subjected to a common ambient temperature.

In addition, it is a particular feature of the present invention that the gap 47 be as small as possible, and since it is the function of the salt or oxide layer in the gap 47 to keep the cathode 46 spaced from the anode 45, it will be apparent that the volume of such salt or oxide may be as small or thin as possible. In fact, it has been demonstrated by actual experimentation that this spacing material need be only a thin oxide coating on the active surface of either the anode 45 or the cathode 46, and that it is preferable to have as thin a coating as practical. Accordingly it may be presumed that it is preferable for purposes of obtaining maximum current flow between these two electrodes, this coating of spacing material (which may be disposed on the active surface of either electrode) may be only a few molecules thick. It need not be equal in distribution between the two active surfaces, but must be arranged so as to preferably prevent physical contact between any portion of the active surface of the cathode 46 with any portion of the active surface of the anode 45. Accordingly, it will be apparent that the coating of oxide may be formed in the manner of strips or spots of oxidation on the active surface of only one of the two electrodes provided that the gap 47 is maintained by such a coating.

Many other variations and modifications will be apparent from a comprehension of the teachings hereinbefore set forth without departing from the basic concept of the present invention. Accordingly, it should be clearly understood that the methods and structure hereinbefore described and depicted in the accompanying drawings are intended to be illustrative only, and are not intended as limitations on the present invention.

What is claimed is:
1. Apparatus for translating thermal energy into electrical energy, comprising
 a cathode responsive to thermal energy and composed of a first element high on the electromotive series of elements,
 an anode disposed in closely spaced relationship to said cathode and composed of a second element lower on the electromotive series than said first element,
 spacing means to maintain said cathode and anode in said closely spaced and in an electrically insulated relationship, one to the other, and including filling means composed of an oxide of one of said first and second elements disposed between said cathode and anode and conducting electrons emitted by said cathode to said anode, and
 means to derive an electromotive force between said cathode and anode.

2. Apparatus for translating thermal energy into electrical energy, comprising
 a cathode responsive to thermal energy and composed of a first element high on the electromotive series of elements,
 an anode disposed in closely spaced relationship to said cathode and composed of a second element lower on the electromotive series than said first element, spacing means to maintain said cathode and anode in said closely spaced and in an electrically insulated relationship, one to the other, and including filling means composed of a salt of one of said first and second elements disposed between said cathode and anode and conducting electrons emitted by said cathode to said anode, and means to derive an electromotive force between said cathode and anode.

3. Vacuum tube apparatus for preventing corrosion by conducting heat by electron flow from metals subject to corrosion, comprising evacuated hollow body means of insulating material having opening means from the hollow thereof, insulating closure means for said opening means, a cathode element extending sealingly through said closure means, the exterior end of said cathode element being adapted to be placed in contact with a metal object to be protected against corrosion, the interior end of said cathode element extending into said hollow of said body, said cathode element being composed of material higher in the electromotive series than the metal of said metal object, an elongate anode element having an intermediate point thereof disposed closely spaced from said cathode element within said hollow body and having two end portions each sealingly extending through a separate part of said closure means, said anode element end portions each being composed of a different material than the material of the other end portion and each end portion material being lower in the electromotive series than the material of said cathode element, said intermediate point being a thermo-junction between said anode end portions and closely spaced across a gap from said cathode element within said hollow body, an insulated electrical conductor extending from said body from each end portion of said anode element, electrical load means connected between said insulated electrical conductors exterior of said body, said cathode element conducting heat from said metal object as electronic flow and emitting electrons across said gap to said thermo-junction of said anode element, said cathode element being adapted for electrical interconnection with said metal object to protect said metal object against electrolytic corrosion, there being a flow of useful electrical energy created in said anode element for transfer to said electrical load.

4. Device for cooling metal objects, comprising an evacuated hollow body of electrical insulating material, a cathode element extending sealingly from within said body to the exterior thereof and having its exterior end in heat conducting relation with a metal object requiring cooling, an anode element having a thermo-junction thereof spaced across a gap from said cathode element within said body and comprising dissimilar materials at opposite sides of said thermo-junction, said dissimilar materials of said anode element each being lower in the electromotive series than the material of which said cathode element is composed, said cathode element being composed of material higher in the electromotive series than said metal object, an insulated conductor extending from each end of said anode to the exterior of said body, an electrical load connected between said conductors exterior of said body, heat being conducted from said metal object through said cathode element as electronic flow and across said gap to said anode element as electronic discharge to cool said object, useful electrical energy being created in said anode for operating said electrical load.

5. Apparatus for translating heat into electrical energy comprising a cathode formed of a first element high on the electromotive series for emitting electrons in response to heat, an anode formed of a second element lower on the electromotive series and having a work function greater than that of said first element, spacing means formed of a material including at least one of said first and second elements and disposed to space said cathode from but in close proximity to said anode and to conduct electron flow from said cathode to said anode and substantially prevent electron flow from said anode to said cathode, shielding means for preventing contamination of said cathode, and conducting means electrically interconnecting said cathode and anode.

6. The apparatus described in claim 5, wherein said second element forming said anode has a higher coefficient of thermal conductivity than said first element forming said cathode.

7. The apparatus described in claim 6, wherein said anode is formed of a metal selected from the group consisting of aluminum and copper.

8. The apparatus described in claim 7, wherein said cathode has an active electron-emissive surface, wherein said anode has an active electron-receiving surface, and wherein said spacing means is a compound of one of said first and second elements with a third element.

9. The apparatus described in claim 8, wherein said active surface of said cathode confronts and is closely spaced to said active area of said anode, and wherein said spacing means is a coating on one of said active surfaces and disposed adjacent to said other surface.

10. Apparatus for translating heat energy into electrical energy comprising a cathode to emit electrons in response to heat energy, and thermo-junction means electrically connected with said cathode, said thermo-junction means including a first electrode composed of a first preselected metal, and a second electrode disposed in contact with said first electrode and composed of a second preselected metal lower on the electromotive series than said first metal, and wherein said cathode is disposed adjacent said thermo-junction formed by said first and second electrodes and is composed of a third preselected metal higher on the electromotive series than said first metal.

11. Apparatus as described in claim 10, wherein said thermo-junction means comprises a first electrode composed of a first preselected metal, and a second electrode disposed in contact with said first electrode and composed of a second preselected metal lower on the electromotive series than said first metal, and wherein said cathode is disposed adjacent said thermo-junction formed by said first and second electrodes and is composed of a third preselected metal higher on the electromotive series than said first metal.

12. The apparatus as described in claim 10 wherein said cathode is closely spaced to said thermo-junction formed by said first and second electrodes.

13. The apparatus as described in claim 10, including conductor means interconnected to derive a power output across said first and second electrodes.

14. Apparatus for translating heat energy into electrical energy comprising a first electrical conductor composed of a metal, a second electrical conductor composed of a metal high on the electromotive series for emitting electrons in response to heat, a third electrical conductor disposed between said first and second electrical conductors for conducting heat therebetween and composed of a metal lower on the electromotive series than said metal composing said second conductor, a fourth electrical conductor disposed in a closely spaced relationship to said second conductor for receiving said electrons emitted by said second conductor, and means for deriving an electromotive force between said first and fourth conductors.

15. The apparatus as described in claim 14, wherein said fourth conductor is at a lower temperature than said second conductor.

16. The apparatus as described in claim 15, wherein said metal composing said third conductor is higher on the electromotive series than said metal composing said first conductor.

17. The apparatus as described in claim 16, wherein said fourth conductor is composed of a metal lower on the electromotive series than said metal composing said third conductor.

18. The apparatus described in claim 17, including spacing means disposed between said second and fourth conductors and formed of a material including at least one of the metals composing said second and fourth conductors.

19. Apparatus for translating heat into electrical energy comprising a cathode formed of a first element high on the electromotive series for emitting electrons in response to heat, an anode disposed in a closely spaced relationship to said cathode to receive said electrons and formed of a second element low on the electromotive series, and spacing means separating said cathode from said anode and forming a layer of semiconductor material on the adjacent surface of at least one of said cathode and anode.

20. The apparatus described in claim 19, wherein said spacing means forms a layer of semiconductor material on the adajcent surfaces of both said cathode and anode.

21. The apparatus described in claim 20, wherein said spacing means also forms a layer of insulating material between said layers of semiconductor material on said adjacent surfaces of said cathode and anode.

22. Apparatus for promoting the growth of vegetation in a medium, said apparatus comprising a first substance disposed in said medium and composed of an element high on the electromotive series, a second substance composed of another different element lower on the electromotive series and disposed in said medium, a third electrically insulating substance disposed to maintain a closely spaced-apart relationship between said first and second substances and to conduct electrons therebetween, and means for deriving an electromotive force between said first and second substances.

23. A method of producing an electromotive force comprising disposing a first substance high on the electromotive series in a closely spaced and electrically insulated relationship to a second substance lower on the electromotive series, disposing a third electron conducting substance between said first and second substances to maintain said relationship, and heating said first substance.

References Cited

UNITED STATES PATENTS

| | | | |
|---|---|---|---|
| 784,346 | 3/1905 | Pilsoudsky | 47—1.3 |
| Re. 24,879 | 9/1960 | Caldwell | 310—4 |
| 1,128,229 | 2/1915 | Comstock | 310—4 |
| 2,510,397 | 6/1950 | Hansell | 310—4 |
| 2,863,074 | 12/1958 | Johnstone | 310—4 |
| 3,054,914 | 9/1962 | Hatsopoulous et al. | 310—4 |
| 3,138,725 | 6/1964 | Houston | 310—4 |
| 3,358,162 | 12/1967 | Krake et al. | 310—4 |
| 2,299,260 | 10/1942 | Sivian | 310—4 |
| 2,688,648 | 9/1954 | McIlvaine | 310—4 X |

FOREIGN PATENTS 1,003,204  9/1965  Great Britain.

ROBERT SEGAL, Primary Examiner

C. R. CAMPBELL, Assistant Examiner

U.S. Cl. X.R.

47—1.3